United States Patent
Holm

(10) Patent No.: US 11,285,991 B2
(45) Date of Patent: Mar. 29, 2022

(54) ELECTROMAGNETIC DAMPING SYSTEM FOR STEERING SYSTEM

(71) Applicant: Steering Solutions IP Holding Corporation, Saginaw, MI (US)

(72) Inventor: David P. Holm, Davison, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 295 days.

(21) Appl. No.: 16/518,370

(22) Filed: Jul. 22, 2019

(65) Prior Publication Data
US 2021/0024124 A1    Jan. 28, 2021

(51) Int. Cl.
*B62D 5/04*    (2006.01)
*B62D 3/12*    (2006.01)
*F16D 27/14*    (2006.01)

(52) U.S. Cl.
CPC ........... *B62D 5/0439* (2013.01); *B62D 3/12* (2013.01); *F16D 27/14* (2013.01)

(58) Field of Classification Search
CPC ......... F16H 19/04; F16H 57/028; B62D 3/02; B62D 5/04; B62D 7/148
USPC ....................................... 180/444
See application file for complete search history.

(56) References Cited

U.S. PATENT DOCUMENTS

| 7,044,263 B2 * | 5/2006 | Fischbach ............ B62D 5/0424 180/443 |
| 2004/0104067 A1 | 6/2004 | Fishbach et al. |

FOREIGN PATENT DOCUMENTS

| CN | 103047314 A | 4/2013 |
| CN | 107035786 A | 8/2017 |
| JP | 10100927 A * | 4/1998 |

OTHER PUBLICATIONS

First Office Action and Search Report regarding corresponding CN App No. 2020107089384; dated Nov. 12, 2021.

* cited by examiner

*Primary Examiner* — Minnah L Seoh
*Assistant Examiner* — Felicia L. Brittman
(74) *Attorney, Agent, or Firm* — Dickinson Wright PLLC

(57) ABSTRACT

An electromagnetic damping system for a steering system includes a pinion gear having a pinion shaft and engaged with a steering rack. The electromagnetic damping system also includes a friction disk operatively coupled to the pinion shaft. The electromagnetic damping system further includes an electromagnetic clutch located adjacent the friction disk, the electromagnetic clutch disposed in a spaced position relative to the friction disk in a first condition of the electromagnetic clutch, the electromagnetic clutch disposed in a contact position relative to the friction disk in a second condition of the electromagnetic clutch to damp the rate of movement of the steering rack.

14 Claims, 3 Drawing Sheets

ELECTROMAGNETIC DAMPING SYSTEM FOR STEERING SYSTEM

BACKGROUND

The embodiments described herein relate to vehicle steering systems and, more particularly, to an electromagnetic damping system for such steering systems.

In rear wheel steering applications, preventing the rear steering system from oscillating uncontrollably while in a faulted state is required for the safety of the operator. A faulted state may include a failed microcontroller, a loss of battery supply power, or a broken drive belt in a system with a ball screw and belt, for example.

In some rear wheel steering applications, an electrical solution with a way to provide motor damping is used to control the system in the event of a failure. In the event of a mechanical failure (e.g., broken belt) in the motor path, it is possible to have a state where the motor is unable to provide the stability control needed to maintain control of the vehicle. Front wheel steering applications may have control issues as well during a fault state. Therefore, a system that assists with steering control during a fault state is desired.

SUMMARY

According to one aspect of the disclosure, an electromagnetic damping system for a steering system includes a pinion gear having a pinion shaft and engaged with a steering rack. The electromagnetic damping system also includes a friction disk operatively coupled to the pinion shaft. The electromagnetic damping system further includes an electromagnetic clutch located adjacent the friction disk, the electromagnetic clutch disposed in a spaced position relative to the friction disk in a first condition of the electromagnetic clutch, the electromagnetic clutch disposed in a contact position relative to the friction disk in a second condition of the electromagnetic clutch to damp the rate of movement of the steering rack.

According to another aspect of the disclosure, an electromagnetic damping system for a steering system includes a steering rack for controlling a wheel position. The electromagnetic damping system further includes a rotating component that interfaces with the steering rack to assist with steering rack position control. The electromagnetic damping system yet further includes a friction disk operatively coupled to the rotating component. The electromagnetic damping system also includes an electromagnetic clutch located adjacent the friction disk, the electromagnetic clutch disposed in a spaced position relative to the friction disk in a first condition of the electromagnetic clutch, the electromagnetic clutch disposed in a contact position relative to the friction disk in a second condition of the electromagnetic clutch to damp the rate of movement of the steering rack.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
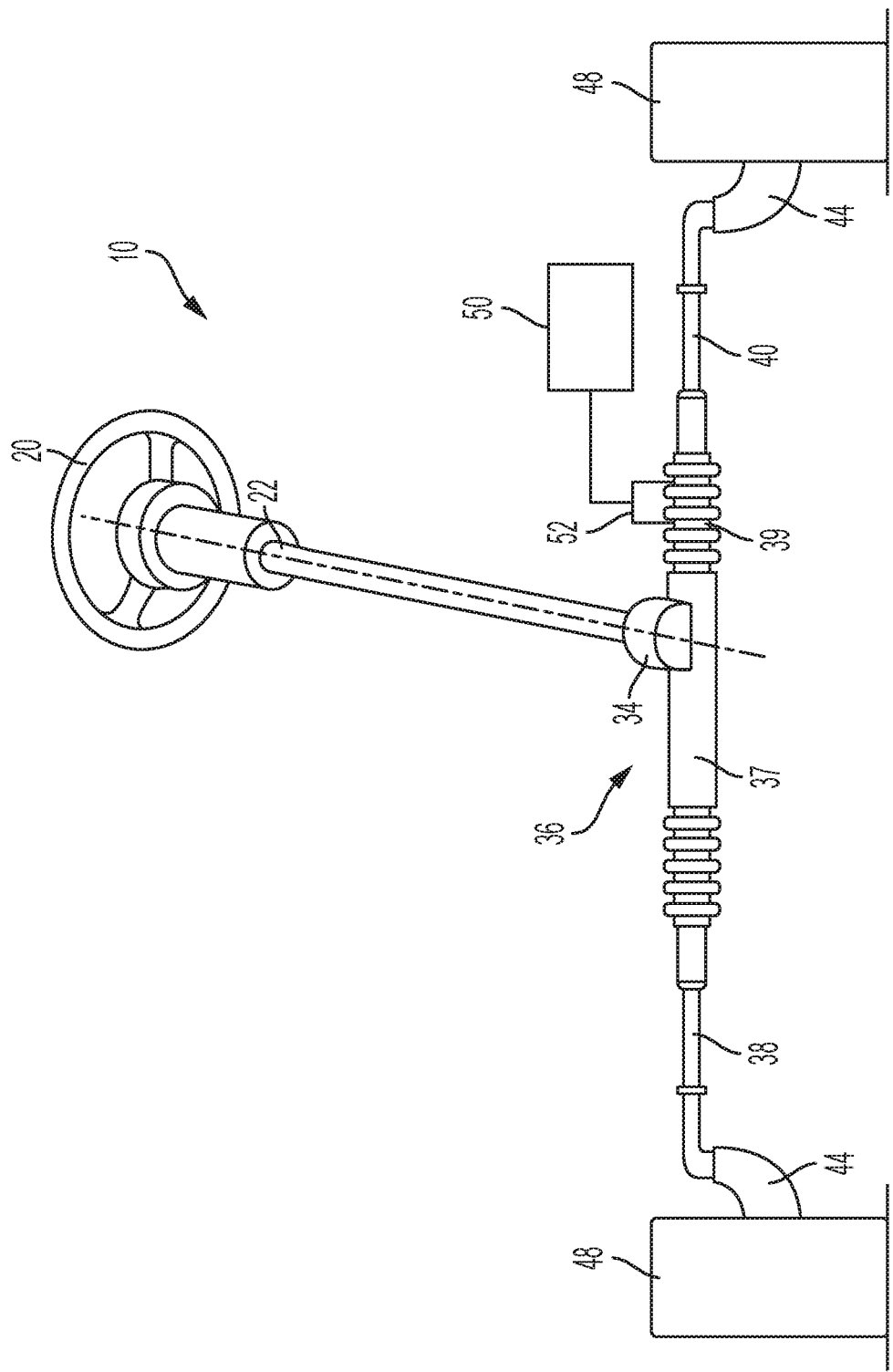
FIG. 1 is a perspective view of a vehicle steering system.

Referring now to the Figures, where the invention will be described with reference to specific embodiments, without limiting same, FIG. 1 illustrates a vehicle steering system 10 that is provided to steer a vehicle in a desired direction. The steering system 10 may include a hand wheel 20 operatively connected to a gear housing 34 via a steering column 22. The steering column 22 may be formed with one or more column sections, such as an upper column and a lower column, for example, but it is to be appreciated that various numbers of column sections may be employed. Also included is a rack assembly 36, part of which is a rack 37 with toothed sections thereon, tie rods 38, 40, steering knuckles 44, and road wheels 48.

The steering system 10 is an electric power steering system that utilizes a rack and pinion steering mechanism, which includes the rack 37 and a pinion gear located within a pinion housing 34. During operation, as hand wheel 20 is turned by a vehicle operator, the steering column 22 turns the pinion gear. Rotation of the pinion gear moves the rack 37, which moves tie rods 38, 40. Tie rods 38, 40 in turn move respective steering knuckles 44, which turn the respective road wheels 48. It is to be appreciated that the steering system 10 may include fewer or more shaft or column components. Furthermore, as described above, in some embodiments a steer-by-wire system is provided where a physical connection is not present between the hand wheel 20 (or other steering input device) and a lower/forward portion of the steering column 22.

The steering system 10 includes a power steering assist assembly that assists steering effort with a motor 50 that drives a ball-screw assembly in a rack assist electric power steering (REPS) system embodiment. In particular, a nut 52 is engaged with a ball screw portion 39 of the rack assembly 36 to assist with translation of the rack 37.

Figure 2:
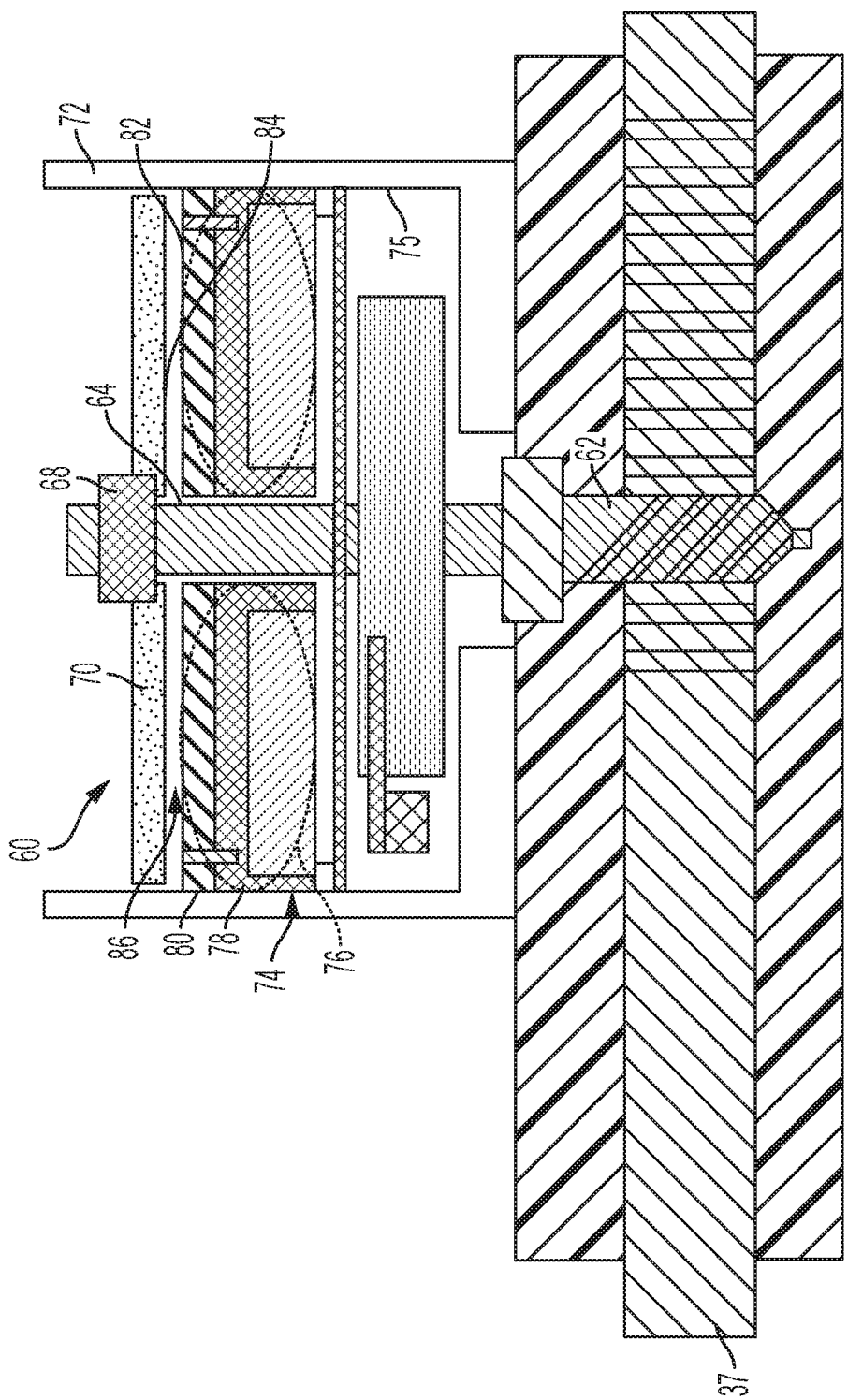
FIG. 2 is a view of an electromagnetic damping system for a vehicle steering system in a first condition.
Figure 3:
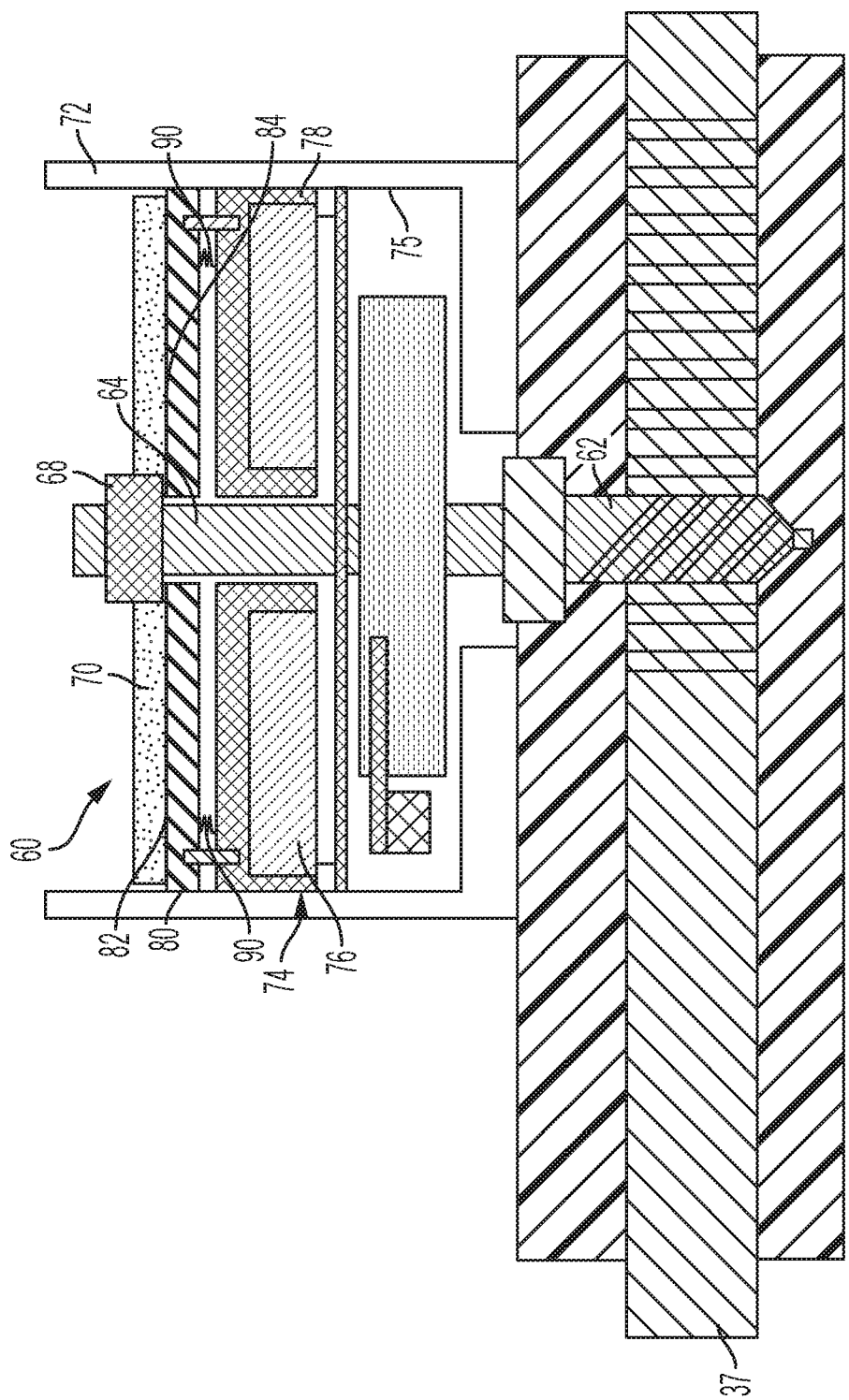
FIG. 3 is a view of the electromagnetic damping system in a second condition.

Referring now to FIGS. 2 and 3, the rack assembly 36 is shown in greater detail to illustrate an electromagnetic damping system 60. As described herein, the electromagnetic damping system 60 dampens—but does not lock—the rate at which the rack 37 translates during a fault event of the steering system 10. The dampening herein stabilizes vehicles during one or more failure conditions while the vehicle wheels return to the center position and holding this position. This may be particularly beneficial for rear wheel steering systems.

The electromagnetic damping system 60 includes a pinion gear 62 having a gear portion engaged with the rack 37 and a pinion shaft 64. A hub 68 surrounds a portion of the pinion shaft 64 and has a friction disk 70 extending radially outwardly therefrom. At least a portion of the pinion shaft 64, the hub 68 and the friction disk 70 are contained within a housing 72.

The electromagnetic damping system 60 also includes an electromagnetic clutch 74 that is formed with a coil 76, a magnet 78, and an armature 80. The armature 80 has a braking surface 82 that is disposed adjacent a surface 84 of the friction disk 70. The armature 80 may be a disk or other component sized similar to the friction disk 70, but numerous various geometries of the armature 80 are contemplated. The electromagnetic clutch 74 is disposed within the housing 72. In some embodiments, the electromagnetic clutch 74 is operatively coupled to an interior wall 75 of the housing 72 for structural support.

As shown in FIG. 2, during normal operation of the vehicle steering system (i.e., no fault event substantially affecting steering control) the electromagnetic clutch 74 is in a powered (i.e., energized) condition and produces an electromagnetic flux field that exerts an attractive magnetic force between the magnet 78 and the armature 80. The attractive magnetic force maintains an air gap 86 between the armature 80 and the friction disk 70. The air gap 86 ensures that the friction disk 70 is free to rotate with the pinion shaft 64 with little to no friction. This condition may be referred to as a spaced position for the armature 80 and the friction disk 70.

As shown in FIG. 3, during a fault event (or power off condition) the electromagnetic clutch 74 is in an unpowered (i.e., de-energized) condition. In such a condition, the electromagnetic flux field is not present to provide the attractive magnetic force between the magnet 78 and the armature 80. One or more springs 90 extend between, and are operatively coupled to, the magnet 78 and the armature 80 to exert a spring force on the armature 80 to bias the armature 80 toward, and into contact with, the friction disk 70. In particular, the braking surface 82 of the armature 80 is moved into contact with the surface 84 of the friction disk 70. This may be referred to as a contact position. In the contact position, the braking surface 82 of the armature 80 pushes against the surface 84 of the friction disk 70 to dampen rotation of the pinion shaft 64. The electromagnetic damping system provides a calibrated friction element and controls the rate at which the rack 37 can move, thus providing a safe steering condition.

The total spring force exerted by the spring(s) 90 is less than the attractive magnetic force generated during the energized condition of the electromagnetic clutch 74. Therefore, the magnetic force overcomes the spring force to ensure that the contact position between the armature 80 and the friction disk 70 does not occur during normal operation of the steering system. Therefore, the pinion shaft 64 is free to rotate normally.

Although described herein and illustrated as engaging the electromagnetic clutch 74 with the pinion shaft 64, it is to be appreciated that the electromagnetic clutch 74 may engage any rotating component that interfaces with the rack 37 in other embodiments. For example, the electromagnetic clutch 74 may engage with a component associated with a ball screw assembly.

The embodiments disclosed herein provide stability to steering systems under fault conditions during electrical and/or mechanical failures. The rotating element that interfaces with the rack 37, such as the pinion gear 62, is used as a reacting force in the event of a failure, as the interfacing rotating element is considered a robust structural element associated with steering control.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:

1. An electromagnetic damping system for a steering system comprising:
    a pinion gear having a pinion shaft and engaged with a steering rack;
    a friction disk operatively coupled to the pinion shaft; and
    an electromagnetic clutch located adjacent the friction disk, the electromagnetic clutch disposed in a spaced position relative to the friction disk in a first condition of the electromagnetic clutch, the electromagnetic clutch disposed in a contact position relative to the friction disk in a second condition of the electromagnetic clutch to damp the rate of movement of the steering rack, wherein the electromagnetic clutch comprises a coil, a magnet, and an armature, the armature moveable to define the spaced position and the contact position of the electromagnetic clutch.

2. The electromagnetic damping system of claim 1, wherein the first condition of the electromagnetic clutch is a de-energized condition and the second condition of the electromagnetic clutch is an energized condition.

3. The electromagnetic damping system of claim 1, further comprising a pinion housing containing at least a portion of the electromagnetic clutch.

4. The electromagnetic damping system of claim 3, wherein the electromagnetic clutch is operatively coupled to an interior wall of the pinion housing.

5. The electromagnetic damping system of claim 1, further comprising a spring operatively coupled to, and disposed between, the magnet and the armature, the spring exerting a spring force on the armature to bias the armature toward the contact position, the magnet exerting an attractive magnetic force on the armature in the first condition that is greater than the spring force.

6. The electromagnetic damping system of claim 5, wherein the spring is one of a plurality of springs operatively coupled to, and disposed between, the magnet and the armature, the attractive magnetic force exerted by the magnet being greater than a combined spring force of the plurality of springs in the first condition of the electromagnetic clutch.

7. An electromagnetic damping system for a steering system comprising:
    a steering rack for controlling a wheel position;
    a rotating component that interfaces with the steering rack to assist with steering rack position control;
    a friction disk operatively coupled to the rotating component; and
    an electromagnetic clutch located adjacent the friction disk, the electromagnetic clutch disposed in a spaced position relative to the friction disk in a first condition of the electromagnetic clutch, the electromagnetic clutch disposed in a contact position relative to the friction disk in a second condition of the electromagnetic clutch to damp the rate of movement of the steering rack, wherein the electromagnetic clutch comprises a coil, a magnet, and an armature, the armature moveable to define the spaced position and the contact position of the electromagnetic clutch.

8. The electromagnetic damping system of claim 7, wherein the first condition of the electromagnetic clutch is a de-energized condition and the second condition of the electromagnetic clutch is an energized condition.

9. The electromagnetic damping system of claim 7, further comprising a housing containing at least a portion of the electromagnetic clutch and at least a portion of the rotating component.

10. The electromagnetic damping system of claim 9, wherein the electromagnetic clutch is operatively coupled to an interior wall of the housing.

11. The electromagnetic damping system of claim 7, further comprising a spring operatively coupled to, and disposed between, the magnet and the armature, the spring exerting a spring force on the armature to bias the armature toward the contact position, the magnet exerting an attractive magnetic force on the armature in the first condition that is greater than the spring force.

12. The electromagnetic damping system of claim 11, wherein the spring is one of a plurality of springs operatively coupled to, and disposed between, the magnet and the armature, the attractive magnetic force exerted by the magnet being greater than a combined spring force of the plurality of springs in the first condition of the electromagnetic clutch.

13. The electromagnetic damping system of claim 7, wherein the rotating component is a ball screw.

14. The electromagnetic damping system of claim 7, wherein the rotating component is a pinion gear.

* * * * *